US010254397B2

(12) United States Patent
Kayano et al.

(10) Patent No.: US 10,254,397 B2
(45) Date of Patent: Apr. 9, 2019

(54) INSPECTION APPARATUS AND INSPECTION SYSTEM (71) Applicant: Kabushiki Kaisha Toshiba, Minato-ku (JP)

(72) Inventors: Hiroyuki Kayano, Fujisawa (JP); Toshiro Hiraoka, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 405 days.

(21) Appl. No.: 14/483,705

(22) Filed: Sep. 11, 2014

(65) Prior Publication Data
US 2015/0084645 A1 Mar. 26, 2015

(30) Foreign Application Priority Data

Sep. 25, 2013 (JP) ................................ 2013-198534
Aug. 18, 2014 (JP) ................................ 2014-165937

(51) Int. Cl.
*G01V 8/00* (2006.01)
*H01Q 1/36* (2006.01)
(Continued)

(52) U.S. Cl.
CPC ............ *G01S 13/887* (2013.01); *G01S 13/04* (2013.01); *G01V 8/005* (2013.01); *H01Q 1/364* (2013.01);
(Continued)

(58) Field of Classification Search
CPC ........ G01S 13/887; G01S 13/04; G01S 13/89; G01S 13/88; G01S 13/00; G01S 13/93;
(Continued)

(56) References Cited

U.S. PATENT DOCUMENTS 5,105,200 A * 4/1992 Koepf .................... H01Q 1/364
                                                    333/101
5,231,273 A * 7/1993 Caswell ............... G06K 7/0008
                                                    235/385
(Continued)

FOREIGN PATENT DOCUMENTS

CN          101910865 A     12/2010
CN          102426361 A      4/2012
(Continued)

OTHER PUBLICATIONS

Charles M. Jackson et al. ("High temperature superconductors for radar applications", Mar. 12, 1991, ISBN: 978-0-87942-629-3).*
(Continued)

Primary Examiner — Timothy A Brainard
Assistant Examiner — Nuzhat Pervin
(74) Attorney, Agent, or Firm — Oblon, McClelland, Maier & Neustadt, L.L.P.

(57) ABSTRACT

An inspection apparatus of an embodiment includes a transmitting antenna device connected to a transmitting unit including a transmitting device configured to transmit a microwave, and a receiving antenna device connected to a receiving unit including a receiving device. Each of the transmitting antenna device and the receiving antenna device faces a subject to be inspected. The receiving antenna device receives at least one of a microwave transmitted from the transmitting antenna device and penetrating the subject to be inspected, a microwave of which phase has been delayed, and a microwave diffracted in the subject to be inspected. The receiving unit is a directional antenna.

29 Claims, 9 Drawing Sheets

TU : TRANSMITTING UNIT
RU : RECEIVING UNIT
S : SUBJECT TO BE INSPECTED (51) Int. Cl.
*H01Q 1/38* (2006.01)
*G01S 13/04* (2006.01)
*G01S 13/88* (2006.01)
*G01S 13/89* (2006.01)
*H01Q 21/06* (2006.01)

(52) U.S. Cl.
CPC ............. *H01Q 1/38* (2013.01); *H01Q 21/061* (2013.01); *G01S 13/89* (2013.01)

(58) Field of Classification Search
CPC . G01V 8/005; G01V 3/12; G01V 3/18; H01Q 1/364; H01Q 1/38; H01Q 21/061; H01Q 3/00; H01Q 3/02; H01Q 21/06–21/21; H01Q 21/08; H01Q 21/10
USPC ........... 342/22, 70, 639, 25, 17, 18, 179, 27; 250/341; 343/915
See application file for complete search history.

(56) References Cited

U.S. PATENT DOCUMENTS

| | | | | |
|---|---|---|---|---|
| 5,455,594 | A * | 10/1995 | Biasing | H01Q 1/364 343/700 MS |
| 5,786,793 | A * | 7/1998 | Maeda | H01Q 1/38 343/700 MS |
| 5,933,014 | A * | 8/1999 | Hartrumpf | G01N 22/02 324/637 |
| 6,777,684 | B1 * | 8/2004 | Volkov | G01N 21/3581 250/341.1 |
| 6,965,340 | B1 * | 11/2005 | Baharav | G01S 13/89 342/175 |
| 8,248,293 | B2 * | 8/2012 | Kroning | G01S 7/025 342/118 |
| 8,319,678 | B2 * | 11/2012 | Weiss | G01S 13/003 342/175 |
| 2005/0128134 | A1 * | 6/2005 | Shinoda | H01Q 1/3233 342/70 |
| 2006/0109160 | A1 | 5/2006 | Baharav et al. | |
| 2006/0214835 | A1 * | 9/2006 | Lee | G01N 22/00 342/22 |
| 2007/0035437 | A1 | 2/2007 | Steinway et al. | |
| 2007/0205937 | A1 * | 9/2007 | Thompson | G01S 7/414 342/22 |
| 2009/0212990 | A1 * | 8/2009 | Cloutier | G01S 13/32 342/22 |
| 2010/0039309 | A1 | 2/2010 | Carter et al. | |
| 2010/0117885 | A1 * | 5/2010 | Holbrook | H04N 1/107 342/22 |
| 2010/0295725 | A1 * | 11/2010 | Krozer | G01S 13/003 342/25 A |
| 2011/0050480 | A1 | 3/2011 | Kroning et al. | |
| 2015/0153470 | A1 * | 6/2015 | Stove | G01V 3/12 702/6 |

FOREIGN PATENT DOCUMENTS

| | | |
|---|---|---|
| JP | 1-184446 | 7/1989 |
| JP | 5-79939 | 11/1993 |
| JP | 9-246837 A | 9/1997 |
| JP | 2000-275289 A | 10/2000 |
| JP | 2006-98347 A | 4/2006 |
| JP | 2006-145541 | 6/2006 |
| JP | 2006-267102 A | 10/2006 |
| JP | 2008-542759 A | 11/2008 |
| JP | 2009-125257 | 6/2009 |
| JP | 4297905 B2 | 7/2009 |
| WO | WO 2004/095059 A1 | 11/2004 |
| WO | WO-2015077169 A1 * | 5/2015 ............ E05G 5/003 |

OTHER PUBLICATIONS

Extended European Search Report dated Feb. 12, 2015 in Patent Application No. 14184289.8.
Charles M. Jackson, et al., "High Temperature Superconductors for Radar Applications" Proceedings of the National Radar Conference, XP10038706, Mar. 12, 1991, pp. 122-126.
R.W.McMillan, et al., "Concealed weapon detection using microwave and millimeter wave sensors" Microwave and Millimeter Wave Technology Proceedings, XP55167275A, Aug. 20, 1998, pp. 1-4.
Combined Office Action and Search Report dated Jul. 13, 2016 in Chinese Patent Application No. 201410460945.1 (with English language translation).

* cited by examiner

INSPECTION APPARATUS AND INSPECTION SYSTEM

CROSS-REFERENCE TO RELATED APPLICATION

This application is based upon and claims the benefit of priority from Japanese Patent Applications No. 2013-198534, filed on Sep. 25, 2013 and 2014-165937, filed on Aug. 18, 2014; the entire contents of which are incorporated herein by reference.

FIELD

Embodiments described herein relate to an inspection apparatus and an inspection system.

BACKGROUND

General security systems in an airport or the like can check belongings from the image of a human body to which X-rays has penetrated. It is difficult even in a short time to avoid exposure to X-rays. Furthermore, metal detectors can check metals. However, there are problems in that the metal detectors can check only a relatively large material and cannot specify a material inside the human body or materials other than metals. A method for checking materials in addition to metals using terahertz waves is spreading as a relatively new method. However, there are problems in that the terahertz waves cannot check the inside of a human body although can penetrate a material like clothes, and in that the reflection of the terahertz waves on the surface of the human body raises a privacy issue because showing the body shape.

DETAILED DESCRIPTION

An inspection apparatus of an embodiment includes: a transmitting antenna device connected to a transmitting unit including a transmitting device configured to transmit a microwave; and a receiving antenna device connected to a receiving unit including a receiving device. Each of the transmitting antenna device and the receiving antenna device faces a subject to be inspected. The receiving antenna device receives at least one of a microwave transmitted from the transmitting antenna device and penetrating the subject to be inspected, a microwave of which phase has been delayed, and a microwave diffracted in the subject to be inspected. The receiving unit is a directional antenna.

The inspection system of the embodiment includes a transmitting unit transmitting a microwave to a subject to be inspected, a receiving unit receiving at least one of the microwave penetrating the subject to be inspected, the microwave of which phase has been delayed, and the microwave diffracted in the subject to be inspected, and a detecting unit detecting a foreign material in the subject to be inspected by analyzing the received signal.

(First Embodiment)

Figure 1:
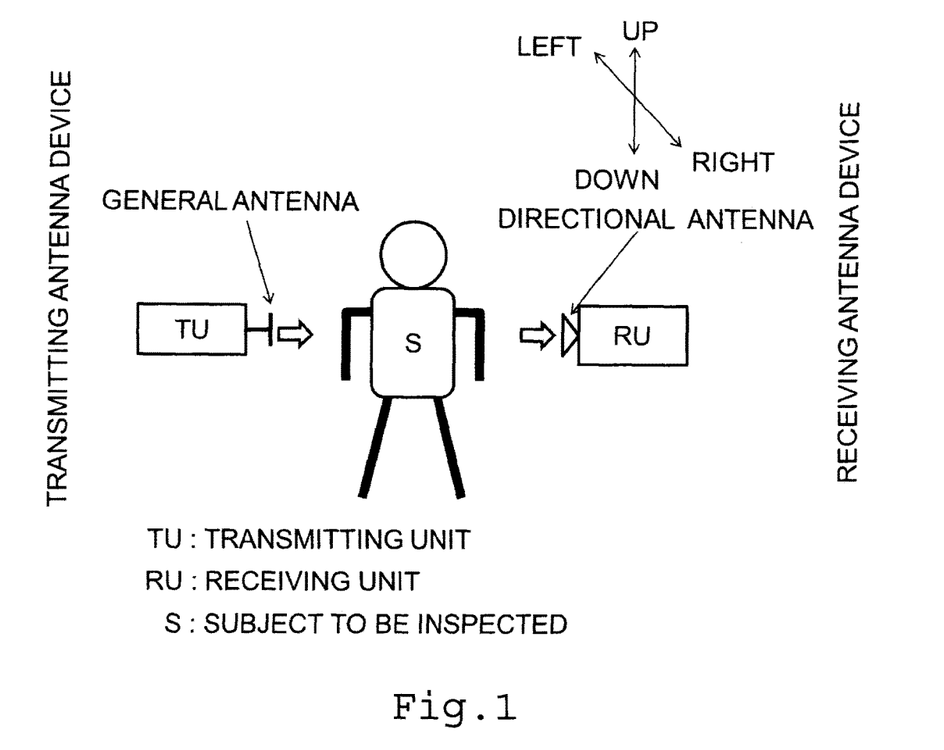
FIG. 1 is a conceptual diagram of an inspection apparatus according to an embodiment.

The inspection apparatus according to the first embodiment includes a transmitting antenna device having a transmitting unit configured to transmit a microwave, and a receiving antenna device having a receiving unit having a directional antenna configured to receive a microwave. When a subject to be inspected is irradiated with the microwaves transmitted from the transmitting antenna device, the microwave is diffracted and reflected in the metal area of the subject to be inspected, and the phase of the microwave is delayed in the dielectric area. The microwaves penetrate other areas while being attenuated. The receiving unit receives the variation of the microwave caused by at least one of a metal and a dielectric. This can detect whether the subject to be inspected includes a metal or a dielectric. The subject to be inspected is placed between the transmitting antenna device and the receiving antenna device. FIG. 1 is a conceptual diagram of an inspection apparatus according to the first embodiment. A general antenna can be used because directivity is not required for the transmitting unit especially. A high-directivity antenna is used in the receiving unit to detect a metal or a dielectric. The higher directivity the receiving unit has, the more highly accurate information the receiving unit can obtain. The subject to be inspected is preferably placed such that each of the transmitting antenna device and the receiving antenna device faces the subject to be inspected. The increase in the frequency of the microwave increases the resolution while reducing the signal intensity. On the other hand, the decrease in the frequency causes the opposite. The microwave includes a preferable frequency band for the inspection according to the embodiment. This enables the inspection described above.

The inspection apparatus illustrated in FIG. 1 includes a configuration preferable for detecting a metal and a dielectric in a subject to be inspected. Using the inspection apparatus illustrated in FIG. 1 in the inspection of the subject to be inspected can detect a metal and a dielectric included in the subject to be inspected and measure the amounts of the metal and the dielectric.

The inspection system of the embodiment includes a transmitting unit transmitting a microwave to a subject to be inspected, a receiving unit receiving at least one of the microwave penetrating the subject to be inspected, the microwave of which phase has been delayed, and the microwave diffracted in the subject to be inspected, and a detecting unit detecting a foreign material in the subject to be inspected by analyzing the received signal. The receiving unit has a directional antenna. The transmitting unit is included, for example, in a transmitting antenna device having a transmitting unit configured to transmit a microwave. The receiving unit is included, for example, in a receiving antenna device having a receiving unit having a directional antenna configured to receive a microwave. The detecting unit is configured, for example, to create an image of the received signal, or to detect a foreign material (abnormality) according to the received signal. It can be determined whether a foreign material is included in the subject to be inspected by a person, or automatically with a computer using an arbitrary algorithm.

Differently from a terahertz wave or a millimeter wave, a microwave can also inspect the inside of a human body and thus can detect a dielectric or a metal when a human body includes them. Using X-rays can also inspect the inside of a human body. However, an inspection apparatus using X-rays is not preferable because there is a risk due to the exposure. The inspection apparatus according to the embodiment is used for the inspection of the passage of the place at which safety is required, for example, at an airport or a commercial facility. Accordingly, it is preferable to perform an inspection using a microwave that is an electromagnetic wave having a low impact on the subject to be inspected even if the subject to be inspected is frequently inspected. The inspection can be performed in a non-contact manner. The inspection can be completed in a short time in which the subject to be inspected is irradiated with the microwaves and the microwaves pass through the subject. Thus, the subject can be inspected while moving or at rest.

The inspection can be performed using the difference between the permittivity of water and the permittivity of the subject to be inspected. This is caused from the fact that the time required for a microwave to move in a dielectric varies depending on the permittivity. For example, when the subject to be inspected is an animal such as a human being, the animal includes water. When a container of water is placed on the surface of the animal or inside the animal, the permittivity of the part at which the water in the container is placed differs from the permittivity of the subject to be inspected. Comparing the permittivity of the typical subject to be inspected with the permittivity of the part detects the part at which the water is placed. This can detect a foreign material. The inspection in the embodiment can inspect the difference of the permittivities not as the surface area of the part having the different permittivity but as the volume of the part (the product of [the difference in the permittivity per unit volume] and [the volume]).

Moving the receiving antenna device of the inspection apparatus up and down or right and left, or up and down and right and left using a driving unit scans the subject to be inspected with a microwave. This can obtain the two-dimensional information about the subject to be inspected. The directions of the up, down, right and left are illustrated in the drawings. When a variable directional antenna is used in the receiving unit, controlling the directivity of the antenna can omit some of the movements of the receiving antenna device. The microwave signals received in the receiving unit is divided into a transmission signal and a signal of which phase has been delayed due to the dielectric. The images of the subject to be inspected and the dielectric in the subject to be inspected can be created using the intensities of the signals, respectively. Creating the images can determine the distribution of the dielectric (which part of the subject to be inspected the dielectric is included in and what shape the dielectric has), and the amount of the dielectric. When the image of the dielectric is created, the image of the amount of the water that is the dielectric can be created.

Furthermore, the image of a metal in the subject to be inspected can be created according to the signal of the microwave diffracted around the metal. Creating the image can determine the distribution of the metal (which part of the subject to be inspected the metal is included in and what shape the metal has), and the amount of the metal. It can be determined whether there is an abnormality (danger) according to the combination of the information about the part in which the dielectric or the metal has been detected, the shape of the dielectric or the metal, and the amount of the dielectric or the metal. When an abnormality is detected, the occurrence of the abnormality can be announced, for example, in a visual or auditory manner.

When the images of the distribution and amount of the dielectric or the metal are created, the foreign material detection is preferably performed by comparing the previously-formed reference data about each type of subject to be inspected without a foreign material with the measured data. The distribution or the like of the dielectric or the metal varies depending on the type of the subject to be inspected. Thus, it is preferable to detect a foreign material from the comparison of the measured result and the reference data about the subject to be inspected without a foreign material, which has previously been classified and formed according to the type of the subject, rather than to detect a foreign material only from the measured result. The types of subjects to be inspected variously include the biological species, the gender, the size, the age, and the like. The classification of the type of subject to be inspected is preferably determined depending on the purpose of the inspection. If the posture of the subject to be inspected during the inspection differs from the posture in the reference data, it is preferable to equalize or approximately equalize the posture in the measured data and the posture in the reference data by processing one of the measured data and the reference data. When a foreign material inspection is performed with the comparison of the images in which the distribution and amount of the dielectric or the metal are measured, the image comparison can be performed by a person or can be automated with a computer. Note that, when the measured value of the distribution or amount of the dielectric or the metal exceeds a threshold, it is preferable to give a notice of the excess. The threshold can be set for each type of subject to be inspected, or can be set at a numerical value in common. The threshold or the criteria for the foreign material detection can arbitrarily be changed depending on the purpose of the inspection.

The detection of a hazardous material, such as an explosive housed in a plastic bag embedded in a human body, or a resin weapon can be cited as a concrete example of a detection of a hazardous material. It is difficult to detect the hazardous materials described above in the inspection with a millimeter wave. The inspection apparatus of the embodiment can detect also a concealed metal weapon carried by the subject to be inspected. The weapon can also be detected in a noncontact manner in an inspection with a millimeter wave or a metal detector.

The inspection (scan), detection of a dielectric or a metal, creation of the image of a dielectric or a metal, determination of abnormality, and detection of abnormality using the inspection apparatus can be systemized and further automated using a computer. It is preferable in the inspection method according to the embodiment that the receiving unit of the receiving antenna, or the receiving unit of the receiving antenna and the receiving unit of the transmitting antenna receive at least one of the microwave that has been transmitted from the transmitting antenna and has penetrated the subject to be inspected, the microwave of which phase has been delayed, the microwave that has been diffracted around the subject to be inspected, and the microwave that has been reflected on the subject to be inspected in order to detect at least one of the metal and dielectric included in the subject to be inspected according to the microwave received in one of the receiving units. Automating the inspection using the inspection apparatus can provide an apparatus that performs a rapid inspection. Such an apparatus is preferably installed, for example, at the doorway of a public facility or a performance facility.

The accuracy in inspection of the inspection apparatus according to the embodiment depends on the directivity and sensitivity of the antenna in the receiving unit, and the size of the antenna. Even if the antenna has high directivity and sensitivity, it is difficult to obtain high-resolution information when the antenna is large in size. Reducing the size of the antenna increases the loss due to the conductor loss of the antenna. Thus, the antenna can receive few signals. In light of the foregoing, a small and high-directivity antenna, for example, a superconducting antenna is preferably used for inspecting a subject to be inspected with a high degree of accuracy.

Miniaturizing a normal conductive antenna while placing a plurality of antennas closer to each other increases the wiring resistance of the antenna patterns, and thus increases the loss of signal. When the antenna is not miniaturized, the antenna for the electromagnetic waves of microwaves is relatively large in size. Thus, it is difficult to place many antennas for obtaining directivity. When the antennas are few in number, the area covered with an antenna is increased. This causes the loss of the position resolution and increases the time required for the signal process. It is assumed in the embodiment that the inspection apparatus is used in an environment in which a prompt inspection is required. It is difficult for an inspection apparatus using an existing antenna to perform a prompt inspection. It is also difficult for a large antenna to recognize the position or shape of a foreign material or the like. It is difficult to use such a large antenna as the receiving antenna for an inspection requiring resolution. A small and highly directional superconductive antenna can be miniaturized because the wireless resistance does not exist among the antenna patterns. It is preferable in the inspection apparatus of the embodiment to place many antennas so as to implement a highly directional antenna because this prompts the signal process.

The superconducting antenna according to the embodiment is preferably a planar antenna including one or more antennas and a ground pattern that are made of a superconducting material on a dielectric substrate with low loss between long wave bands and millimeter wave bands. When there are a plurality of antenna patterns, the distance between the antenna patterns next to each other is equal to or less than $\lambda/10$ on the assumption that the resonator frequency of the antenna is $\lambda$.

Figure 2:
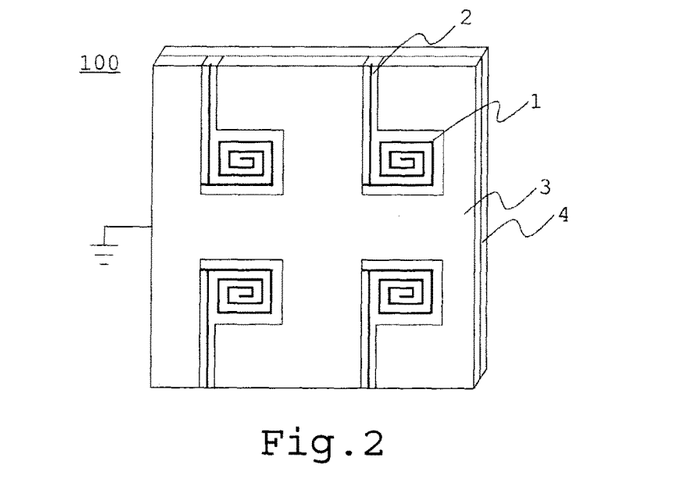
FIG. 2 is a conceptual diagram of a planar antenna according to an embodiment.

FIG. 2 is a conceptual diagram of a planar antenna 100 according to the embodiment. The planar antenna illustrated in the conceptual diagram of FIG. 2 includes a superconducting antenna 1, a feeding channel 2, and a ground pattern 3 on a low-loss dielectric substrate 4. The superconducting antenna 1 is formed on a side or both sides of the substrate.

One or more superconducting antennas 1 exist on the low-loss dielectric substrate 4. The superconducting antenna 1 is an oxide superconducting film including one or more of elements Y, Ba, Cu, La, Ta, Bi, Sr, Ca, Pb, and the like and formed into a desired antenna pattern shape. For example, a well-known lithographic technique can be used to the pattern shape forming process. The pattern shape of the superconducting antenna 1 has, for example, a monopole shape, a dipole shape, a crank shape, a rectangular, circular, or elliptical spiral shape, an L shape, or an inverted F shape. Furthermore, the superconducting antenna 1 can be, for example, a CPW type antenna including a ground and a signal wire on a side and having a length of the integral multiple of quarter-wavelength, or a slot type antenna in which a slot is provided at a part of the ground. Although the superconducting antenna 1 includes four antennas in FIG. 2, the number of antennas or the position or direction of the antenna can appropriately selected for any purpose.

The superconducting antenna 1 is a microstrip line made of an oxide superconducting film. The wire width can take on various values depending on the design. There is low loss due to the antenna 1 even when the wire is equal to or less than several hundred micrometers in width. This is because a superconducting material is used for the wire. The superconducting antennas 1 have a common resonance frequency.

The superconducting antenna 1 is cooled to a superconducting state while the antenna operates. The cooling temperature can be equal to or less than a desired temperature depending on the superconducting film to be used. The superconducting antenna 1 is connected to both of the feeding channel 2 and the ground pattern 3.

The feeding channel 2 supplies electric power to the superconducting antenna 1. An antenna signal is input and output through the feeding channel 2. In light of the manufacturing process, the feeding channel 2 is preferably made of the same material as the superconducting antenna 1.

Using the superconducting antennas 1 can reduce the space between the superconducting antennas 1 next to each other to $\lambda/10$ or less on the assumption that the resonance frequency of the superconducting antennas 1 is $\lambda$. A conventionally used antenna that is a processed metal pattern of, for example, a normal conducting copper has a problem in that the reduction in the antenna size reduces the gain due to the loss. Thus, it is undesirable that the antenna made of a normal conducting material is equal to or less than $\lambda/5$ in size in a system in which the reduction in gain at the antenna unit is not allowed. On the other hand, the loss of the superconducting antennas 1 is small enough to be ignored. Thus, the reduction in gain due to downsizing of the antenna is significantly small. Accordingly, the antenna can be reduced to $\lambda/10$ or less in size. As described above, reducing the space between the superconducting antennas 1 to $\lambda/10$ or less can place a plurality of antennas in a space of a single device of a conventional antenna. Thus, the antennas can be arrayed. This can implement a high directivity. Herein, the space between the superconducting antennas 1 is the minimum distance between the superconducting antennas 1 next to each other. Note that the space between the superconducting antenna 1 on a side of the substrate and the superconducting antenna on the other side is preferably equal to or less than $\lambda/10$ for the same reason.

When the superconducting antenna 1 is formed into a spiral pattern, the longest side of the pattern shape is preferably equal to or less than $\frac{1}{10}$ of the wiring of the superconducting antenna 1 in length. Satisfying the condition is preferable in light of downsizing.

The feeding channel 2 is sometimes provided with a delay line or a resistance film. Providing a delay line or a resistance film can provide a phase difference between the signals of the antennas. Providing a phase difference between the signals of the antennas can divide the signals of the antennas. A delay line can be, for example, a material that changes the signal channel, that changes the inductance of the signal, or that changes the temperature of the superconducting line.

The ground pattern 3 is connected to each of the superconducting antennas 1. The ground pattern 3 can be a conductive film while being preferably made of the same material as the superconducting antenna 1 in light of the manufacturing process.

The substrate of the superconducting antenna 1 is preferably the low-loss dielectric substrate 4 with low loss between short wave bands and millimeter wave bands. A material with low loss can be, for example, a sapphire or MgO.

The planar antenna 100 can be produced, for example, in the following method. A superconducting oxide film is evaporated onto the low-loss dielectric substrate 4, for example, made of a sapphire, using a laser evaporation method, a sputtering method, an evaporation method, a chemical vapor deposition method, or the like. Then, the evaporated oxide film can be processed with a mask on which the patterns of the antenna, the feeding channel, and the ground pattern are formed, using a lithography technique. Note that a superconducting oxide film is used as the superconducting antenna 1 because the wiring is narrow in width and long in length. Forming the patterns of the antenna 1 and the ground 3 using a lithography method can reduce the space between the antennas 1 to $\lambda/10$ or less.

Figure 3:
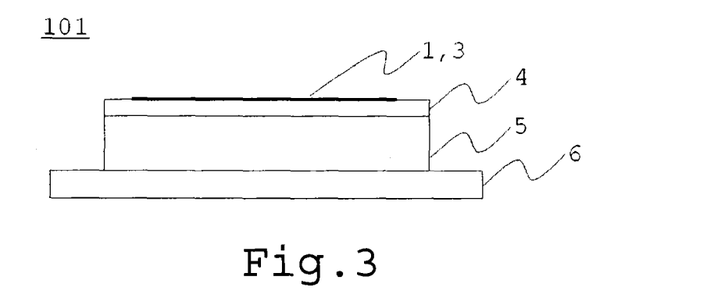
FIG. 3 is a conceptual diagram of a planar antenna according to an embodiment.

FIG. 3 is a conceptual diagram of a superconducting antenna device 101 provided with a metal plate 6 for reflecting radio waves. Implementing the superconducting antenna 1 while the dielectric 5 is held on the metal plate 6 can improve the directivity using the reflected wave from the metal plate 6. In that case, the dielectric preferably has a thickness in which the resonance frequency of the antennas has an effective wavelength of $\lambda/8$ to $\lambda/4$ on the assumption that the resonance frequency is $\lambda$. It is preferable to use a dielectric with a minimum loss.

A specific receiving unit is preferably an array antenna that is layered planar antennas. The array antenna according to the embodiment is cooled with a refrigerating machine (not illustrated in the drawings) in such a way as to become a superconducting state. In light of the improvement in directivity and gain, the planar antennas 100 are used preferably while being layered.

Figure 4:
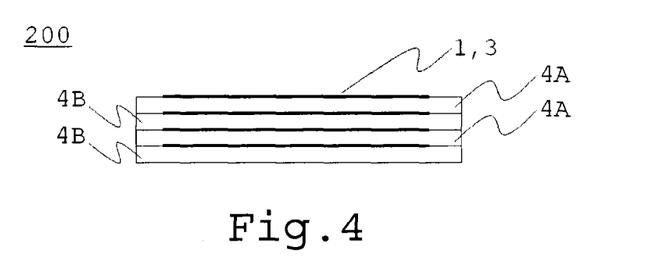
FIG. 4 is a conceptual diagram of a layered planar antenna according to an embodiment.
Figure 5:
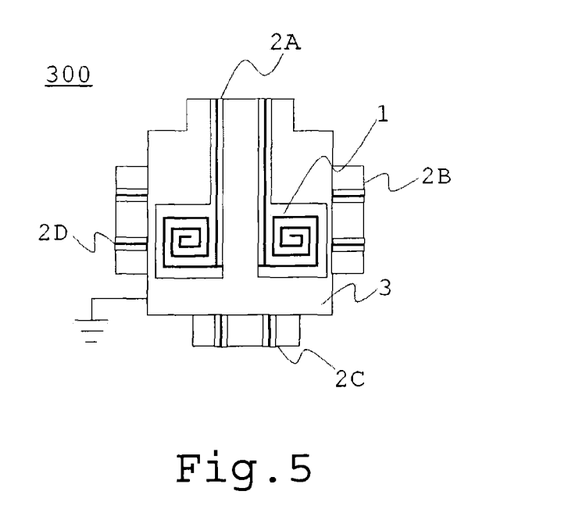
FIG. 5 is a conceptual diagram of a layered planar antenna according to an embodiment.

FIGS. 4 and 5 are conceptual diagrams of an exemplary layered structure of the planar antennas. The planar antenna illustrated in FIGS. 4 and 5 includes two superconducting antennas on the substrate. The exemplary antenna has a protruded feeding channel. In light of the connection to the circuit in the rear of the antenna, the edge of the feeding channel is preferably protruded.

An array antenna 200 illustrated in the conceptual cross-sectional diagram of FIG. 4 has planar antennas of which superconducting antenna patterns are not displaced from each other. As illustrated in FIG. 4, four antenna layers are layered. Each of the four antenna layers can have a structure in which a superconducting antenna is placed on a side of each dielectric. Alternatively, dielectrics 4A that include the superconducting antennas 1 and the ground patterns 3 on both sides and dielectrics 4B that do not include a superconducting antenna can be layered alternately. In the latter, the antennas are formed on both sides of the dielectric 4A. Thus, the superconducting antennas 1 can share a dielectric substrate, in other words, can include substrates having the same thickness even if the substrates have been warped at the time of manufacture. This can reduce the individual variability in the superconducting antennas 1. The array antenna illustrated in FIG. 4 has a preferable structure in light of the improvement in the directivity of the antenna using a plurality of antennas.

An array antenna 300 illustrated in the conceptual top diagram of FIG. 5 has a layered structure in which the superconducting antenna patterns are displaced from each other by 90°. In the array antenna illustrated in FIG. 5, an antenna layer A, an antenna layer B, an antenna layer C, and an antenna layer D are layered alternately while being displaced from each other by 90°. The array antenna 300 illustrated in FIG. 5 has a structure in which edges 2A, 2B, 2C, and 2D of the feeding channels of all the layered patch antennas are oriented to different directions, or in which each edge of the feeding channels is oriented to a different direction from the edge of the next higher layered patch antenna and the edge of the next lower layered patch antenna. The array antenna illustrated in FIG. 4 has a preferable structure in light of mutual coupling reduction between the antennas. The array antenna is preferably an end-fire array antenna or a broadside array antenna.

A specific antenna device having a structure in which an array antenna is placed in a vacuum insulation tank will be described. The superconducting antenna device according to the embodiment preferably includes an array antenna that is layered planar antennas having an antenna and ground pattern made of a superconducting material on a dielectric substrate with low loss between short wave bands and millimeter wave bands, a vacuum insulation tank housing the array antenna, a refrigerating machine that cools the array antenna, a vacuum insulation window that allows the electromagnetic waves between short wave bands and millimeter wave bands to penetrate in the direction of the directivity of the array antenna in the vacuum insulation tank.

Figure 6:
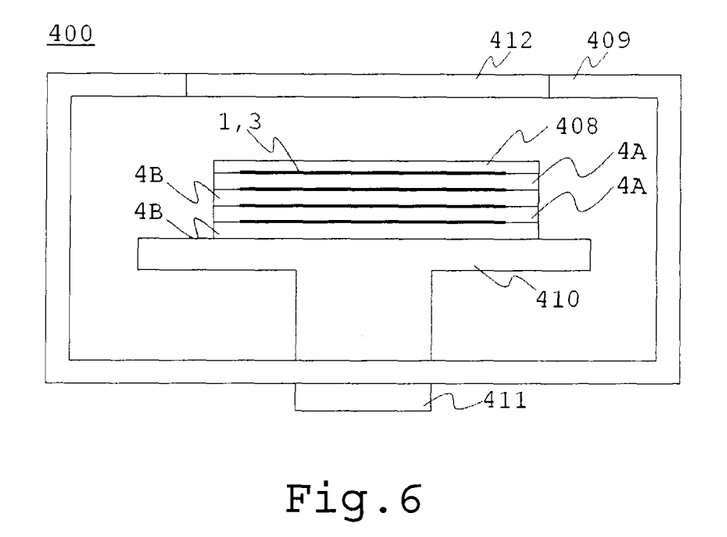
FIG. 6 is a conceptual diagram of an antenna device according to an embodiment.

FIG. 6 is a conceptual diagram of an antenna device 400 according to the embodiment. The antenna device 400 includes an array antenna in which antenna patterns 1 and ground patterns 3 are formed on dielectric substrates 4A and 4B, an infrared reflective film 408, a vacuum insulation tank 409, a cold head 410, a refrigerating machine 411, and a vacuum insulation window 412.

The infrared reflective film 408 prevents an infrared light that heats the antenna from entering the antenna. The infrared reflective film 408 is provided on the surface (on the superconducting antenna 1 side) of the antenna placed opposite to the vacuum insulation window 412 which an infrared light enters in order to prevent the infrared light that heats the superconducting antenna layer from entering. The infrared reflective film 408 is, for example, a metal oxide multi-layer film. When an infrared light source does not exist, the infrared reflective film 408 can be omitted.

The vacuum insulation tank 409 is configured to maintain the temperature and decompression state in the space in which the antenna is placed. The vacuum insulation tank 409 includes an opening in the direction in which the antenna has the highest directivity. The opening includes the vacuum insulation window 412. The vacuum insulation tank 409 is made of a metal, for example, stainless steel. Note that, although not illustrated in the drawings, the vacuum insulation tank 409 is provided with a pump that decompresses the vacuum insulation tank 409.

A cold head 410 is a unit configured to hold and cool the array antenna. The cold head 410 is thermally connected to the refrigerating machine 411 such that the refrigerating machine 411 cools the cold head 410. The cooling temperature varies depending on the superconducting oxide film of the array antenna and is, for example, equal to or less than 77 K.

The refrigerating machine 411 is a unit configured to cool the cold head 410 that cools the array antenna. The refrigerating machine 411 can be provided for the array antenna. Alternatively, when a refrigerating machine is used in the apparatus in which the antenna device is embedded, the refrigerating machine can be used as the refrigerating machine 411.

The vacuum insulation window 412 is provided in the vacuum insulation tank 409 in the direction in which the array antenna has the highest directivity. The vacuum insulation window 412 is made of a material that allows the electromagnetic waves that the antenna transmits and receives to penetrate. For example, ceramics, glass, or acrylic is used. The area of the vacuum insulation window 412 is preferably equal to or larger than the area of the array antenna in terms of the fact that the transmission and reception of the signals is not easily interfered.

Figure 7:
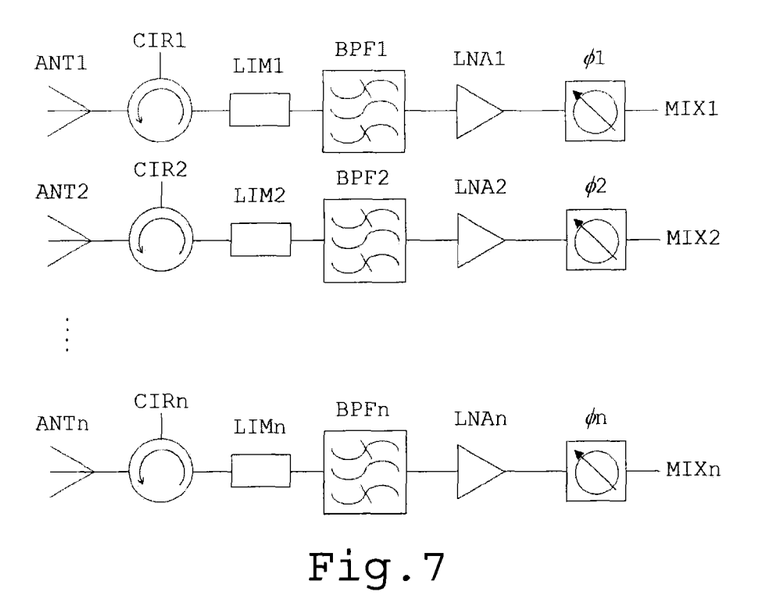
FIG. 7 is a block diagram of a circuit of an antenna device according to an embodiment.

The block diagram of FIG. 7 illustrates the circuit in the antenna device according to the embodiment. In the block diagram of FIG. 7, the circuit includes an antenna (ANT), a transmission system power distribution circuit (CIR), an amplitude limiter (LIM), a band pass filter (BPF), a low-noise amplifier (LNA), and a phase shifter ($\Phi$). Antennas ATN 1 to ANT n are formed into a layered array antenna. The antenna is connected to the amplitude limiter, the band pass filter, the low-noise amplifier, and the phase shifter.

The radio waves transmitted from the antenna supply electric power to the antenna side through the transmission system power distribution circuit and outputs the radio waves. Among the signals of the radio waves received at the antenna that pass through the transmission system power distribution circuit, a signal including amplitude exceeding a threshold is limited in the amplitude limiter. When a signal has large amplitude, the amplitude is preferably limited before the signal is amplified because the signal can break the circuit. The amplitude limiter is arbitrarily placed between the transmission system power distribution circuit and the low-noise amplifier. The signal passed through the amplitude limiter passes through the band pass filter such that signals in wave bands other than the resonance frequency of the antennas are removed. The signal passed through the band pass filter is amplified in the low-noise amplifier. After the signal has passed through the low-noise amplifier, the phase shifter synchronizes the phases of the signals from the antennas. If the antenna is provided with a delay line, the phase shifter can be omitted. The signals passed through the phase shifter are synthesized. The phase shifter makes the passing phase variable. Thus, the beam of the array antenna can be scanned.

In the embodiment, a superconducting material is adopted as the antenna and is cooled to be kept at a superconducting state. Not only the antenna but also the transmission system power distribution circuit, the amplitude limiter, the band pass filter, and the low-noise amplifier are preferably cooled in terms of the improvement in Signal to Noise (SN) ratio for the signal. For example, if the circuit units are placed on the cold head, a common refrigerating machine can cool the circuit units and the superconducting material.

(Second Embodiment)

Figure 8:
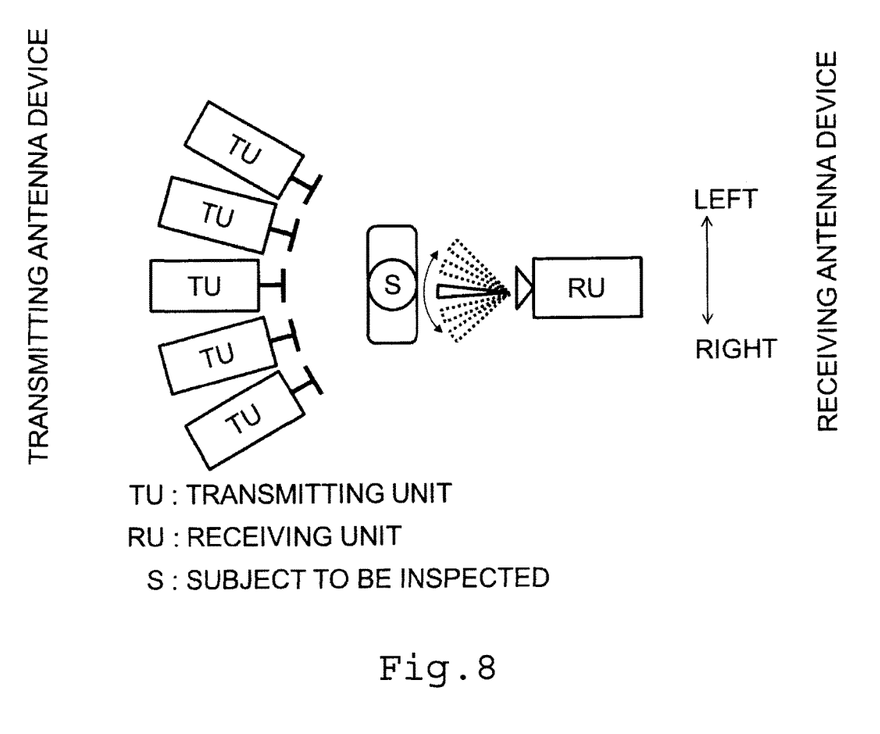
FIG. 8 is a conceptual diagram of an inspection apparatus according to an embodiment.

An inspection apparatus according to the second embodiment includes a transmitting antenna device having a plurality of transmitting units that transmit microwaves from different directions, and a receiving antenna device having a receiving unit having a variable directional antenna that receives microwaves from a plurality of directions. When a subject to be inspected is irradiated with the microwaves transmitted from the directions, the microwave is diffracted and reflected in the metal area of the subject to be inspected, and the phase of the microwave is delayed in the dielectric area. The microwaves penetrate other areas while the microwaves are attenuated. The receiving unit receives, from the directions, the variation of the microwave caused by a metal or a dielectric. This can detect which area in the subject to be inspected includes a metal or a dielectric. The inspection apparatus according to the second embodiment can obtain the two-dimensional information. FIG. 8 is a conceptual diagram of the inspection apparatus according to the second embodiment. The transmitting units are placed in a circular arc centered at the receiving unit. The distances between the transmitting units and the receiving unit are equal to each other. It is preferable in the receiving unit that a high-directivity antenna is used in order to detect a metal or a dielectric and it is preferable that a variable directional antenna is used as the antenna in order to measure the microwaves from the directions using a receiving unit. The higher directivity the receiving unit has, the more accurate information for dividing the microwaves of the transmitting units the receiving unit can obtain. Merely moving the receiving antenna device of the embodiment up and down can obtain the two-dimensional inspection information. Furthermore, an inspection apparatus as the second embodiment that includes a plurality of transmitting units or receiving units is configured to be capable of receiving microwaves from different directions, thus can obtain the three-dimensional information about the position and shape of the detected foreign material. The addition of the three-dimensional information about the position and shape of the detected foreign material can also more accurately detect whether the foreign material is a hazardous material. It is difficult according to the two-dimensional information to detect a foreign material when a combustible or explosive liquid is placed on the body surface having the size nearly equal to a bladder with a low urine volume. However, obtaining the three-dimensional information can determine whether the liquid is on the surface of the subject to be inspected or inside the subject to be inspected. This can improve the accuracy of the inspection of hazardous material. Note that the three-dimensional information can be obtained not only in the present embodiment. Even when an inspection apparatus includes a transmitting unit and a receiving unit, moving one or more of the transmitting unit, the receiving unit, and the subject to be inspected can obtain the three-dimensional information.

(Third Embodiment)

Figure 9:
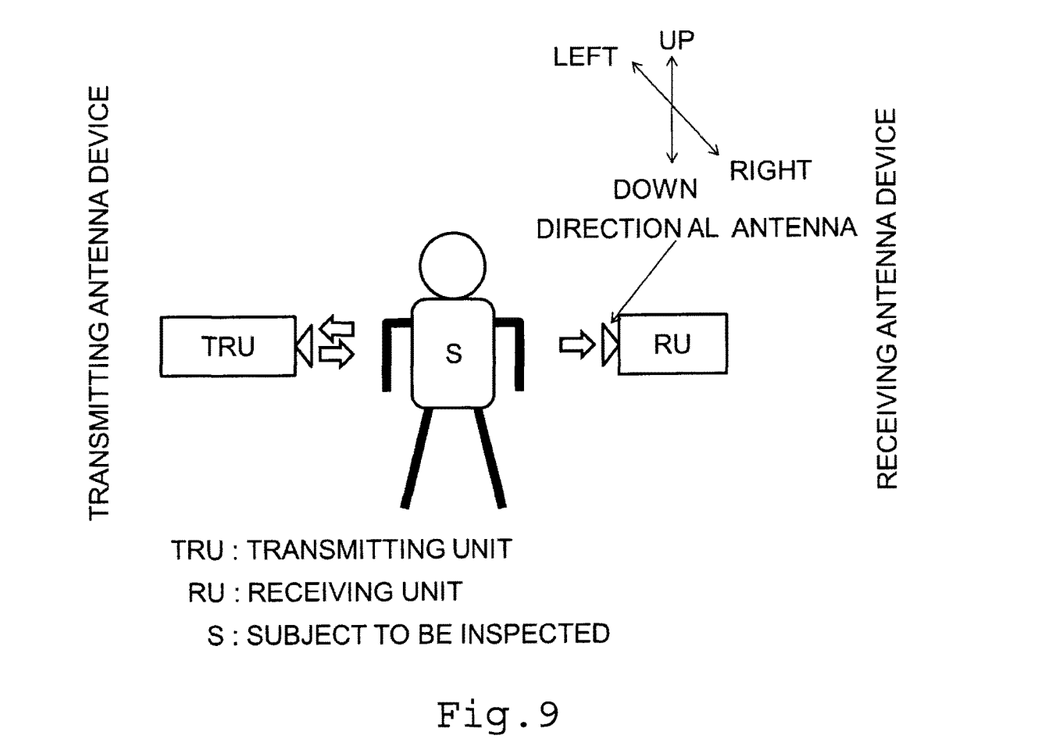
FIG. 9 is a conceptual diagram of an inspection apparatus according to an embodiment.

The inspection apparatus according to the third embodiment includes a transmitting antenna device having a transmitting unit configured to transmit a microwave and a receiving unit configured to receive a microwave, and a receiving antenna device having a receiving unit having a directional antenna configured to receive the microwave. When a subject to be inspected is irradiated with the microwaves transmitted from the transmitting antenna device, the microwave is diffracted and reflected in the metal area of the subject to be inspected, and the phase of the microwave is delayed in the dielectric area. The microwaves penetrate other areas while the microwaves are attenuated. The inspection apparatus includes the transmitting unit and the receiving unit in the transmitting antenna device. Thus, when the subject to be inspected includes a metal, a microwave is reflected on the surface of the metal and the receiving unit in the transmitting antenna device receives the reflected microwave. FIG. 9 is a conceptual diagram of the inspection apparatus according to the third embodiment. Except for the fact that the transmitting antenna device includes both of the transmitting unit and the receiving unit in a transmitting and receiving unit, the inspection apparatus according to the third embodiment is the same as the first embodiment. When millimeter waves are used, the electromagnetic waves are reflected on the surface of the body. This raises the privacy issue of the person to be inspected. However, the electromagnetic waves are reflected only on the metal in the subject to be inspected in the third embodiment. Thus, the reflected microwaves do not include the information about the body shape of the person to be inspected. Accordingly, the third embodiment is preferable in that the privacy issue of the person to be inspected does not occur.

(Fourth Embodiment)

Figure 10:
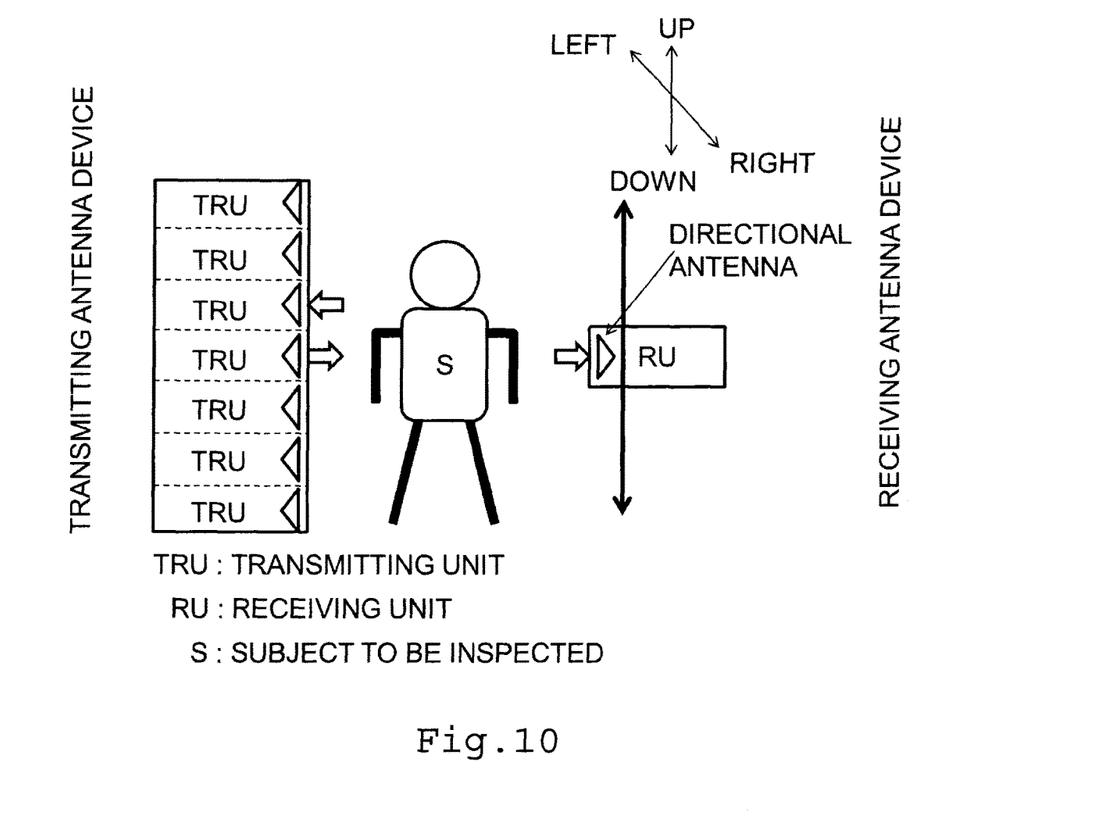
FIG. 10 is a conceptual diagram of an inspection apparatus according to an embodiment.

The inspection apparatus according to the fourth embodiment includes a transmitting antenna device having a plurality of transmitting units configured to transmit microwaves and a plurality of receiving units configured to receive microwaves, and a receiving antenna device having a receiving unit having a directional antenna configured to receive microwaves. The inspection apparatus includes the transmitting units and the receiving units in the transmitting antenna device. Thus, when the subject to be inspected includes a metal, the microwaves are reflected on the surface of the metal and received in the receiving unit in the transmitting antenna device. FIG. 10 is a conceptual diagram of the inspection apparatus according to the fourth embodiment. Except for the fact that the transmitting antenna device includes a plurality of transmitting and receiving units vertically, the inspection apparatus according to the fourth embodiment is the same as the third embodiment. Providing the transmitting and receiving units can rapidly and accurately detect a metal from the reflected waves in the fourth embodiment. A dielectric can also be detected more accurately than the inspection apparatus according to the third embodiment only by moving the receiving unit in the receiving antenna device up and down or right and left.

(Fifth Embodiment)

Figure 11:
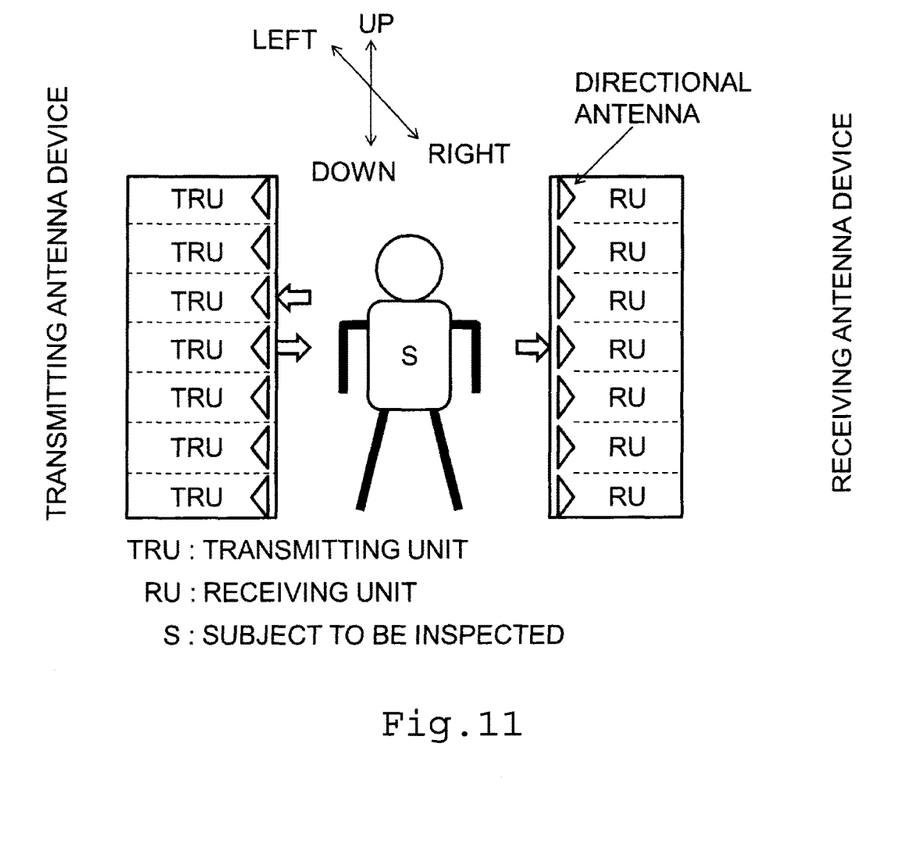
FIG. 11 is a conceptual diagram of an inspection apparatus according to an embodiment.

The inspection apparatus according to the fifth embodiment includes a transmitting antenna device having a plurality of transmitting units configured to transmit microwaves and a plurality of receiving units configured to receive microwaves, and a receiving antenna device having a plurality of receiving units having a directional antenna configured to receive microwaves. FIG. 11 is a conceptual diagram of the inspection apparatus according to the fifth embodiment. Except for the fact that the receiving antenna device includes a plurality of receiving units vertically, the inspection apparatus according to the fifth embodiment is the same as the fourth embodiment. Providing a plurality of transmitting and receiving units in the transmitting antenna device and providing the receiving units in the receiving antenna device can detect a dielectric and metal in the subject to be inspected without moving the transmitting antenna device and the receiving antenna device in the fifth embodiment.

(Sixth Embodiment)

Figure 12:
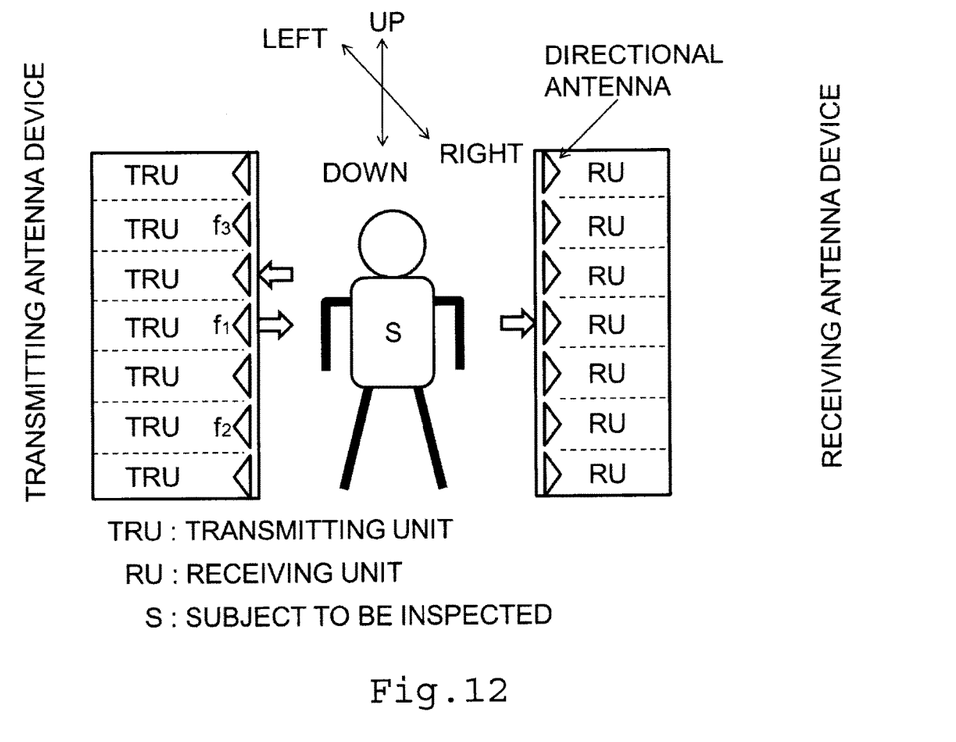
FIG. 12 is a conceptual diagram of an inspection apparatus according to an embodiment.

The inspection apparatus according to the sixth embodiment includes a transmitting antenna device having a plurality of transmitting units configured to transmit microwaves and a plurality of receiving units configured to receive microwaves, and a receiving antenna device having a plurality of receiving units having a directional antenna configured to receive microwaves. In the inspection apparatus according to the sixth embodiment, the transmitting units in the transmitting antenna device transmit microwaves having different frequencies (for example, $f_1$, $f_2$, and $f_3$). FIG. 12 is a conceptual diagram of the inspection apparatus according to the sixth embodiment. Except for the fact that microwaves have different frequencies $f_1$, $f_2$, and $f_3$ in a plurality of transmitting and receiving units, the inspection apparatus in FIG. 12 has the same configuration as the fifth embodiment. The frequencies vary depending on the position at which the microwave is transmitted, and thus the positional information about the transmitting unit in each frequency can be transmitted to each of the receiving units in the sixth embodiment. This can find at what depth in the subject to be inspected the dielectric or metal exists.

(Seventh Embodiment)

Figure 13:
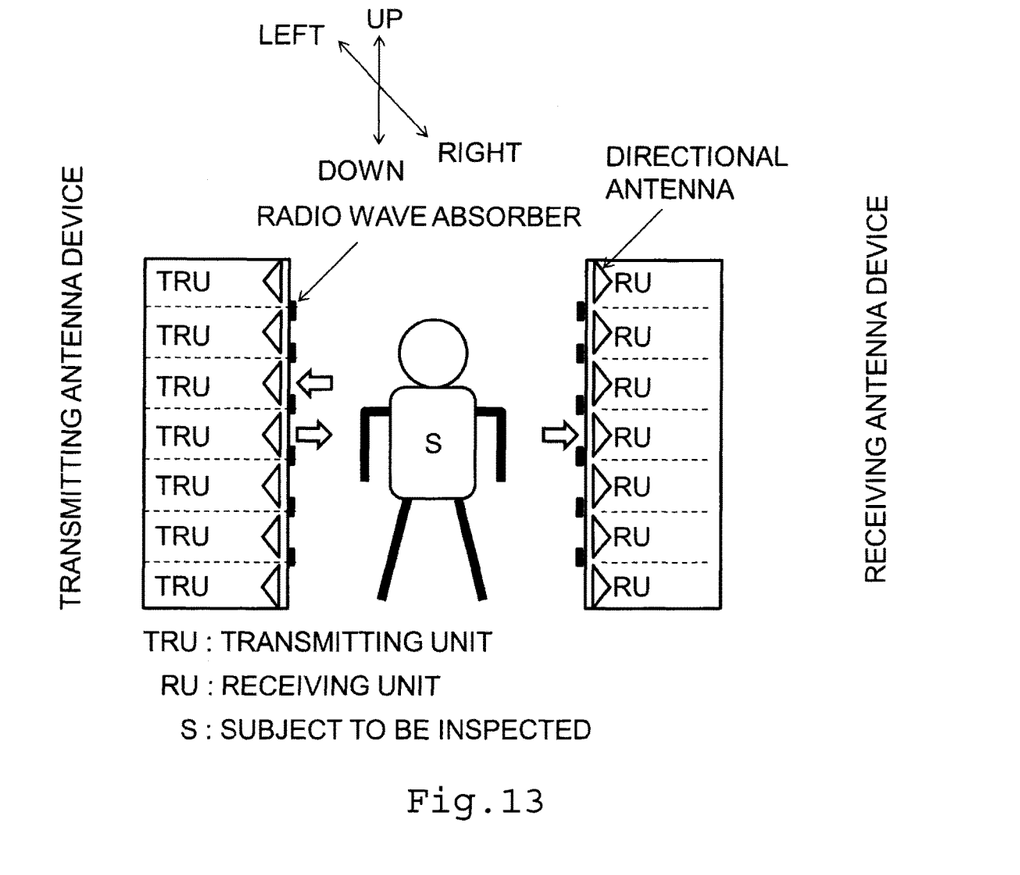
FIG. 13 is a conceptual diagram of an inspection apparatus according to an embodiment.

The inspection apparatus according to the seventh embodiment includes a transmitting antenna device having a plurality of transmitting units configured to transmit microwaves and a plurality of receiving units configured to receive microwaves, and a receiving antenna device having a plurality of receiving units having a directional antenna configured to receive microwaves. FIG. 13 is a conceptual diagram of the inspection apparatus according to the seventh embodiment. The inspection apparatus according to the seventh embodiment includes a radio wave absorber that absorbs the electromagnetic waves that can be reflected in the transmitting antenna device and the receiving antenna device. The radio wave absorber is preferably provided on a side on which the transmitting unit, a transmitting and receiving unit, and the receiving unit are not placed among the sides to transmit and receive the radio waves. Providing the radio wave absorber can reduce the receiving noise.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An inspection apparatus configured to inspect a subject, the apparatus comprising:
   a transmitting flat antenna comprising a first substrate, a first superconducting antenna pattern on the first substrate, and a second superconducting antenna pattern on the first substrate, and configured to transmit a microwave via the first superconducting antenna pattern and the second superconducting antenna pattern, wherein a first distance between the first superconducting antenna pattern and the second superconducting antenna pattern is less than $\lambda/10$, wherein $\lambda$ is a resonance frequency of each of the first and second superconducting antenna patterns: and
   a receiving flat antenna comprising a second substrate, a third superconducting antenna pattern on the second substrate, and a fourth superconducting antenna pattern on the second substrate, and configured to receive at least one of a first microwave penetrating the subject and having a delayed phase, and a second microwave diffracting the subject, via the third superconducting antenna pattern and the fourth superconducting antenna pattern, wherein a second distance between the third superconducting antenna pattern and the fourth superconducting antenna pattern is less than $\lambda/10$, wherein the transmitting flat antenna and the receiving flat antenna face each other, and the subject is placed between the transmitting flat antenna and the receiving flat antenna.

2. The inspection apparatus according to claim 1, wherein the receiving flat antenna is a variable directional antenna.

3. The inspection apparatus according to claim 1, wherein a plurality of the transmitting flat antenna are included in the inspection apparatus and are placed at an equal distance from the receiving flat antenna, and the microwaves transmitted from the plurality of the transmitting flat antenna are received in the receiving flat antenna.

4. The inspection apparatus according to claim 1, wherein the transmitting flat antenna is configured to receive a microwave reflected in the subject.

5. The inspection apparatus according to claim 1, wherein a plurality of the transmitting flat antenna are included in the apparatus and transmit microwaves having different frequencies.

6. The inspection apparatus according to claim 1, further comprising: an electromagnetic wave absorber on at least one of an outer edge of the transmitting flat antenna and an outer edge of the receiving flat antenna.

7. An inspection system configured to inspect a subject, the system, comprising:

a transmitting flat antenna comprising a first substrate, a first superconducting antenna pattern on the first substrate, and a second superconducting antenna pattern on the first substrate, and transmitting a microwave via the first superconducting antenna pattern and the second superconducting antenna pattern, wherein a first distance between the first superconducting antenna pattern and the second superconducting antenna pattern is less than $\lambda/10$, wherein $\lambda$ is a resonance frequency of each of the first and second superconducting antenna patterns, to the subject;

a receiving flat antenna comprising a second substrate, a third superconducting antenna pattern on the second substrate, and a fourth superconducting antenna pattern on the second substrate, and receiving at least one of a first microwave penetrating the subject and having a delayed phase, and a second microwave diffracting the subject via the third superconducting antenna pattern and the fourth superconducting antenna pattern, wherein a second distance between the third superconducting antenna pattern and the fourth superconducting antenna pattern is less than $\lambda/10$; and a detecting unit detecting a foreign material in the subject by analyzing a received signal, wherein the receiving flat antenna receives two-dimensional information of the subject; and the subject is placed between the transmitting flat antenna and the receiving flat antenna.

8. The inspection system according to claim 7, wherein the detecting unit creates a distribution image including at least one of a metal and dielectric in the subject to be inspected according to the received signal.

9. The inspection system according to claim 7, wherein the detecting unit performs a foreign material detection by comparing previously-formed reference data about each type of subject to be inspected without a foreign material with measured data.

10. The inspection system according to claim 7, wherein the detecting unit measures an amount or distribution of one of a metal and a dielectric and, when the amount or the distribution exceeds a threshold, gives a notice of the excess.

11. The inspection apparatus according to claim 1, wherein a size of each of the first superconducting antenna pattern, the second superconducting antenna pattern the third superconducting antenna pattern, and the fourth superconducting antenna pattern is $\lambda/10$ or less, where $\lambda$ is the resonance frequency of each of the first superconducting antenna pattern, the second superconducting antenna pattern, the third superconducting antenna pattern, and the fourth superconducting antenna pattern, respectively.

12. The inspection system according to claim 7, wherein a size of each of the first superconducting antenna pattern, the second superconducting antenna pattern, the third superconducting antenna pattern, and the fourth superconducting antenna pattern is $\lambda/10$ or less, where $\lambda$ is the resonance frequency of each of the first superconducting antenna pattern, the second superconducting antenna pattern, the third superconducting antenna pattern, and the forth superconducting antenna pattern, respectively.

13. The inspection apparatus according to claim 1, wherein the first superconducting antenna pattern and the second superconducting antenna pattern are on a same plane, and the third superconducting antenna pattern and the fourth superconducting antenna pattern are on a same plane.

14. The inspection system according to claim 7, wherein the first superconducting antenna pattern and the second superconducting antenna pattern are on a same plane, and the third superconducting antenna pattern and the fourth superconducting antenna pattern are on a same plane.

15. The inspection apparatus according to claim 1, wherein a first ground pattern, the first superconducting antenna pattern, and the second superconducting antenna pattern are on a same plane, and a second ground pattern, the third superconducting antenna pattern, and the fourth superconducting antenna pattern are on a same plane.

16. The inspection system according to claim 7, wherein a first ground pattern, the first superconducting antenna pattern, and the second superconducting antenna pattern are on a same plane, and a second ground pattern, the third superconducting antenna pattern, and the fourth superconducting antenna pattern are on a same plane.

17. The inspection apparatus according to claim 1, wherein a first ground pattern and the first superconducting antenna pattern is on a first plane of the first substrate, a third ground pattern and the second superconducting antenna pattern are on a second plane of the first substrate, and the second plane is opposite to the first plane, a second ground pattern and the third superconducting antenna pattern are on a third plane of the second substrate, and a fourth ground pattern and the fourth superconducting antenna pattern are on a fourth plane of the second substrate, and the fourth plane is opposite to the third plane.

18. The inspection system according to claim 7, wherein a first ground pattern and the first superconducting antenna pattern are on a first plane of the first substrate, a third ground pattern and the second superconducting antenna pattern are on a second plane of the first substrate, and the second plane is opposite to the first plane, a second ground pattern and the third superconducting antenna pattern are on a third plane of the second substrate, and a fourth ground pattern and the fourth superconducting antenna pattern are on a fourth plane of the second substrate, and the fourth plane is opposite to the third plane.

19. The inspection apparatus according to claim 15, wherein the first ground pattern and the second ground pattern are superconductive material.

20. The inspection system according to claim 16, wherein the first ground pattern and the second ground pattern are superconductive material.

21. The inspection apparatus according to claim 17, wherein the first ground pattern, the second ground pattern, the third ground pattern, and the fourth ground pattern are superconductive material.

22. The inspection system according to claim 18, wherein the first ground pattern, the second ground pattern, the third ground pattern, and the fourth ground pattern are superconductive material.

23. The inspection apparatus according to claim 15, wherein the first superconducting antenna pattern, the second superconducting antenna pattern, the third superconducting antenna pattern, and the fourth superconducting antenna pattern, the first ground pattern, and the second ground pattern are a same superconductive material.

24. The inspection system according to claim 16, wherein the first superconducting antenna pattern, the second superconducting antenna pattern, the third superconducting antenna pattern, and the fourth superconducting antenna pattern, the first ground pattern, and the second ground pattern are a same superconductive material.

25. The inspection apparatus according to claim 17, wherein the first superconducting antenna pattern, the second superconducting antenna pattern, the third superconducting antenna pattern, and the fourth superconducting antenna pattern, the first ground pattern, the second ground pattern, the third ground pattern, and the fourth ground pattern are a same superconductive material.

26. The inspection system according to claim 18, wherein the first superconducting antenna pattern, the second superconducting antenna pattern, the third superconducting antenna pattern, and the fourth superconducting antenna pattern, the first ground pattern, the second ground pattern, the third ground pattern, and the fourth ground pattern are a same superconductive material.

27. The inspection system according to claim 7, wherein the transmitting flat antenna is configured to receive a microwave reflected in the subject, and the microwave reflected in the subject includes signals of metal information of a surface of the subject and does not includes signals of non-metal information of a surface of the subject itself.

28. The inspection apparatus according to claim 1, wherein the receiving flat antenna is a directional antenna, the receiving flat antenna includes a driving device configured to move in one of an up-and-down direction, a right-and-left direction, and an up-and-down and right-and-left direction relative to the subject; and the receiving flat antenna device directly receives at least one of the first microwave and the second microwave.

29. The inspection system according to claim 7, wherein the receiving flat antenna is a directional antenna, the receiving flat antenna includes a driving device configured to move in one of an up-and-down direction, a right-and-left direction, and an up-and-down and right-and-left direction relative to the subject to be inspected, and the receiving flat antenna directly receives at least one of the first microwave and the second microwave.

\* \* \* \* \*